United States Patent Office 2,828,304
Patented Mar. 25, 1958

2,828,304

METHOD OF PREPARING CELLULOSE PROPIONATE ISOBUTYRATE

Carl J. Malm and Loring W. Blanchard, Jr., Rochester, N. Y., assignors to Eastman Kodak Company, Rochester, N. Y., a corporation of New Jersey No Drawing. Application November 18, 1954
Serial No. 469,830

1 Claim. (Cl. 260—225)

This invention relates to cellulose propionate isobutyrates and their preparation.

Of the lower fatty acid esters of cellulose, cellulose acetate is probably the most commonly known. This cellulose ester, however, is not soluble in many organic solvents and the products obtained therefrom exhibit a comparatively low moisture resistance. In those cases where good solubility and/or high moisture resistance are of importance, cellulose acetate-butyrates are usually employed. These esters, however, have been characterized by an odor such as would result from traces of butyric acid which might be liberated at high temperatures or under long storing conditions or as a result of standing in contact with a dead air space for some time. To avoid this odor effect cellulose acetate isobutyrates have been prepared but esters of this type having an even distribution of acetyl and isobutyryl groups throughout the cellulose ester are difficult to prepare due to the wide difference in activity between acetic and isobutyric anhydrides. In some cases with these esters even distribution of the acyl may not be a serious disadvantage but in other cases such as in using borderline solvents or solvent combinations therefor or where high molecular weight plasticizers are employed even distribution is very important. Thus in the plastics industry or in the manufacture of lacquers even distribution of the acyl groups in the cellulose acetate-isobutyrates is often desirable.

One object of our invention is to provide cellulose esters of high moisture resistance and freedom from odor in which even distribution of the acyl therein is not essential. Another object of our invention is to provide esters the manufacture of which is free of the difficulties encountered where the preparation of uniform products is essential. Another object of our invention is to provide a method of preparing cellulose esters characterized by high moisture resistance, good solubility properties and freedom from odor. Other objects of our invention will appear herein.

We have found that if isobutyric acid esters of cellulose are prepared in which propionyl is employed as the secondary acyl, products are obtained having highly desirable properties and with propionyl rather than acetyl it is less important that the acyl groups are uniformly distributed therethrough due to the better solubility of propionates compared to acetates. We have found that the lower reactivity of propionic anhydride and consequently the smaller spread of activity between propionic and isobutyric anhydrides tends to result in a product of more uniform properties than is obtainable when the highly reactive acetyl groups are used in the mixture in which isobutyric acid esters of cellulose are prepared. We have found that esters of high viscosity are much more easily obtained in the case of cellulose propionate isobutyrates due to the greater solubility of those esters in the esterification mixture as compared to the cellulose acetate isobutyrates.

In its broadest aspects our invention comprises the cellulose propionate isobutyrates having an isobutyryl content of at least 15% and the method of preparing those esters by reacting upon cellulose with a mixture of isobutyric anhydride and propionic anhydride or acid. In the making of cellulose propionate isobutyrates by a process in accordance with our invention, it is desirable that the cellulose be first activated by swelling the fibers thereof with water such as by soaking the cellulose in water and removing the water with an organic acid such as acetic acid and then with isobutyric acid or propionic acid or by activating the cellulose by treating it with aqueous sulfuric acid such as of 5–10% concentration. The activation of cellulose may be carried out conveniently by passing cellulose in sheet form over suction boxes where the cellulose sheet is first sprayed with water either at ordinary or elevated temperature and then with organic liquid such as acetic acid followed by propionic or isobutyric acid or by isobutyric or propionic acid directly or the cellulose may be activated by soaking it in aqueous sulfuric acid followed by centrifuging and then removing the water from the cellulose with propionic acid, or a mixture of propionic and isobutyric acid. The preparation of cellulose for esterification by treatment with aqueous sulfuric acid is described in our application Serial No. 469,833, filed of even date.

The esters in accordance with our invention are those in which the only acyl groups employed to esterify the cellulose are isobutyryl and propionyl groups with at least 50% of the acyl thereon being isobutyryl. These esters are readily soluble in various organic solvents and also are susceptible to plasticization by a wide range of plasticizers so as to form plastic products having excellent properties. These esters may be either substantially completely esterified or if desired they may be subjected to partial hydrolysis.

The following examples illustrate our invention:

*Example 1*

Cellulose was activated by immersion in distilled water at 150° F. The water was centrifuged from the cellulose which was then dehydrated with acetic acid and the acetic acid removed with isobutyric acid. After the centrifuging was terminated there resulted a 6.8 lb. cake consisting of approximately 3.5 lbs. of cellulose and 3.3 lbs. of isobutyric acid. This cake was mixed in a Werner-Pfleiderer mixer with a mixture of 10.5 lbs. of isobutyric anhydride, 2.9 lbs. of propionic anhydride and 1.75 lbs. of zinc chloride. The reaction was carried out at 120–135° F. After 5½ hours the cellulose had been completely esterified whereupon a mixture of 2 lbs. of distilled water and 8 lbs. of acetic acid was added thereto and after incorporation of this addition there was then added a mixture of 3.5 lbs. of distilled water, 16.5 lbs. of acetic acid and 170 cc. of concentrated hydrochloric acid. The mass was held at 100° F. for 24 hours whereby the ester was partially hydrolyzed whereupon it was precipitated from the mass and washed with distilled water. A cellulose propionate isobutyrate was obtained having an intrinsic viscosity in acetic acid of 2.0.

*Example 2*

4.2 lbs. of esterification type cotton linters were soaked in 70 lbs. of 10% aqueous sulfuric acid for 5 minutes at 60° F. The cellulose mass was then centrifuged and was given four 5 minute changes with 12 lbs. of a mixture of equal parts of propionic and isobutyric acids at 60° F., the cellulose being centrifuged between each change. A cellulose cake was obtained approximately consisting of 4 lbs. of cellulose, 1.8 lbs. propionic acid, 1.8 lbs. isobutyric acid and 100 grams of sulfuric acid. This cellulose cake was added to a Werner-Pfleiderer mixer containing 15 lbs. of isobutyric anhydride and 1.65 lbs. of propionic anhydride and was run at a temperature of 72–80° F. for 5½ hours whereby a solution was obtained free of fibers. The cellulose propionate isobutyrate obtained was precipitated from the mass. It was found to be useful for the preparation of plastic products of various kinds.

*Example 3*

0.8 lb. of esterification grade cellulose was soaked in 15 lbs. of 15% aqueous sulfuric acid for 5 minutes at 60° F. The cellulose was then centrifuged for 1 minute and was given 4 changes of 5 minutes each with 2.5 lbs. of propionic acid at 60° F. The cellulose was centrifuged between each change. The cake obtained weighed 1.6 lbs. and contained 19.9 grams of sulfuric acid. This cellulose was introduced into Werner-Pfleiderer mixer containing 3.4 lbs. of isobutyric anhydride and was run at 68–80° F. After 7 hours a uniform mass free of fibers was obtained. The cellulose propionate isobutyrate thus obtained was precipitated from the mass with distilled water. A product having good plastic properties was obtained.

We claim:

A method of preparing a cellulose propionate isobutyrate having good solubility properties and high moisture resistance which comprises swelling cellulose with water, removing the water from the cellulose by acid displacement whereby a mass consisting of approximately 1 part each of cellulose and isobutyric acid is obtained, mixing the mass with approximately 3 parts of isobutyric anhydride, and approximately 0.8 part of propionic anhydride and approximately 0.5 part of zinc chloride catalyst, substantially all of the acyl being propionyl and isobutyryl, and continuing the mixing under esterification conditions until the cellulose has been substantially esterified.

References Cited in the file of this patent

UNITED STATES PATENTS

| | | |
|---|---|---|
| 1,858,993 | Heberlein et al. | May 17, 1932 |
| 2,026,583 | Malm et al. | Jan. 7, 1936 |
| 2,048,685 | Clark et al. | July 28, 1936 |
| 2,113,301 | Gardner | Apr. 5, 1938 |
| 2,379,310 | Malm et al. | June 26, 1945 |
| 2,478,396 | Hincke et al. | June 27, 1945 |